Jan. 30, 1923.

C. W. RIPSCH ET AL.
LIFTING JACK.
ORIGINAL FILED JAN. 31, 1919.

1,443,593.

3 SHEETS—SHEET 2.

INVENTORS
CHARLES W. RIPSCH
JAMES C. DAWLEY
BY CHARLES D. DERBY
Edward Reid ATTORNEY Jan. 30, 1923.

C. W. RIPSCH ET AL.
LIFTING JACK.
ORIGINAL FILED JAN. 31, 1919.

1,443,593.

3 SHEETS—SHEET 3.

INVENTORS
CHARLES W. RIPSCH
JAMES C. DAWLEY
BY CHARLES D. DERBY
ATTORNEY

Patented Jan. 30, 1923.

1,443,593

UNITED STATES PATENT OFFICE.

CHARLES W. RIPSCH, JAMES C. DAWLEY, AND CHARLES D. DERBY, OF DAYTON, OHIO, ASSIGNORS TO THE JOYCE-CRIDLAND COMPANY, OF DAYTON, OHIO, A CORPORATION OF OHIO.

LIFTING JACK.

Application filed January 31, 1919, Serial No. 274,281. Renewed June 7, 1920. Serial No. 387,155.

*To all whom it may concern:*

Be it known that we, CHARLES W. RIPSCH, JAMES C. DAWLEY, and CHARLES D. DERBY, citizens of the United States, residing at Dayton, in the county of Montgomery and State of Ohio, have invented certain new and useful Improvements in Lifting Jacks, of which the following is a specification, reference being had therein to the accompanying drawing.

This invention relates to lifting jacks and more particularly to a self-lowering jack.

The object of the invention is to provide a device of this kind with which the load can be quickly and easily lowered under the full control of the operator; and with which the load may be lowered by gravity, or by which it may be positively driven downward.

It is also an object of the invention to provide a device of this kind in which the normal actuating device for lifting the load may be utilized for controlling the lowering mechanism.

It is also an object of the invention to provide such a device which will be simple in its construction and operation; and which will be of such a character that the load can be lowered with safety and accurately controlled as to position.

It is also an object of the invention to provide such a device which will be of a very compact construction, of a very strong, durable character, and of a relatively light weight.

It is also an object of the invention to provide a device of this kind comprising a lifting screw and nut with means for automatically maintaining the nut and screw in alinement.

It is also an object of the invention to provide in a device of this kind a thrust bearing which carries the weight of the load and is of such a construction that the anti-friction members will not form grooves in, or otherwise roughen the surfaces of, the bearing plates.

Other objects of the invention will appear as the mechanism is described in detail.

Figure 1:
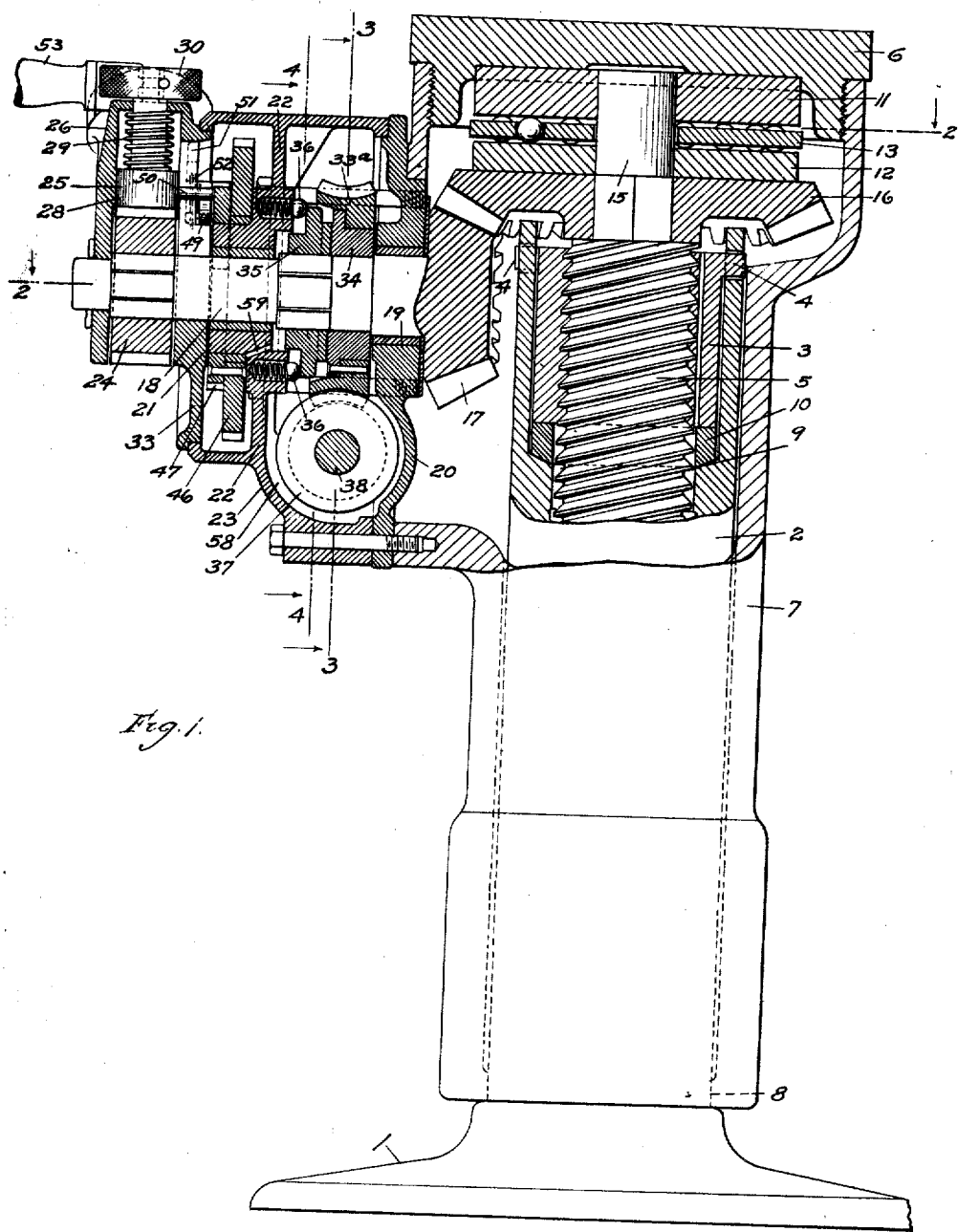
Figure 2:
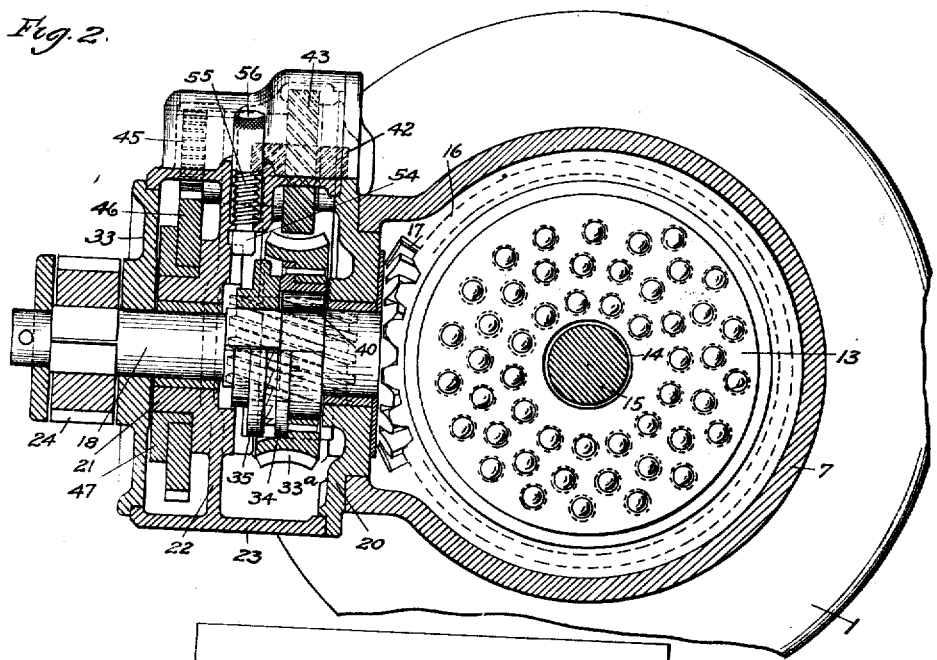
Figure 3:
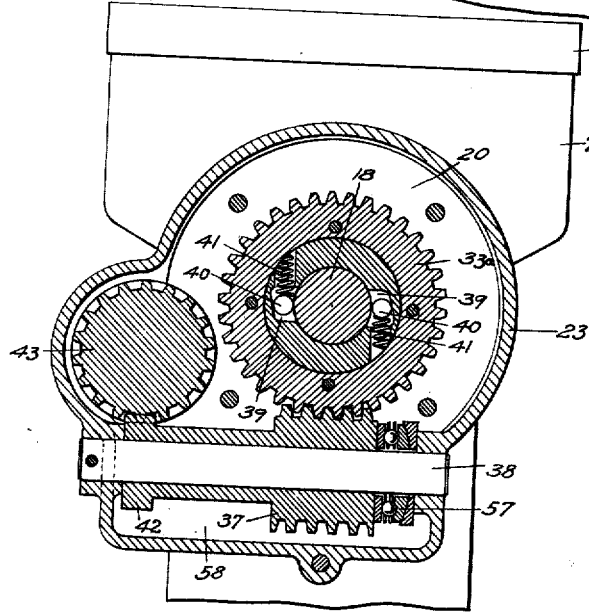
Figure 4:
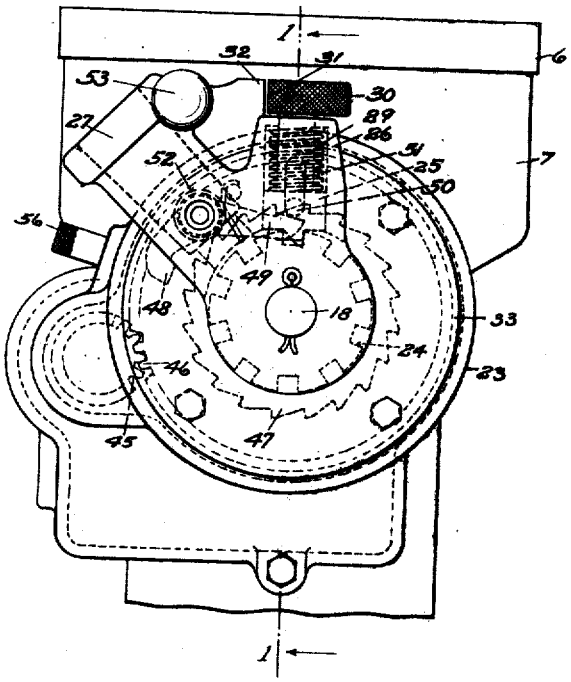
Figure 5:
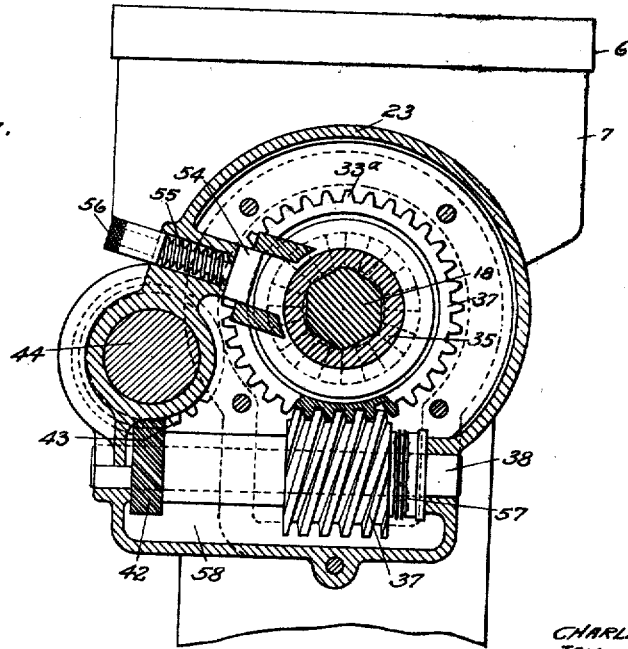

In the accompanying drawings Fig. 1 is a vertical sectional view, partly in elevation; Fig. 2 is a sectional view, taken on the line 2—2 of Fig. 1; Fig. 3 is a sectional view taken on the line 3—3 of Fig. 1 looking in the direction of the arrows; Fig. 4 is a side elevation; and Fig. 5 is a sectional view taken on the line 4—4 of Fig. 1 looking in the direction of the arrows.

In these drawings we have illustrated one embodiment of our invention and have shown the same as applied to a screw operated jack in which the screw constitutes the lifting element and is rotated in a relatively fixed nut to lift the load. It will be understood, however, that this particular type of jack has been chosen for the purpose of illustration only, and that the invention, with or without modification, can be applied to lifting devices of various kinds.

In that form of the device here illustrated, the jack comprises a base 1 having an upwardly extending hollow portion constituting a standard 2, the upper portion of which is enlarged to receive a nut 3 which is held against longitudinal or rotary movement therein, this being accomplished in the present instance by means of lugs 4 extending through openings in the side walls of the standard. Arranged within the standard 2 is a lifting element or screw 5 which meshes with the nut 3, and the threads of which are of such a pitch that under normal conditions the weight of the load on the lifting element will cause the screw to rotate in a direction to lower the load, when the screw has been disconnected from its operating devices. The lifting element is provided at its upper end with a load engaging device or cap 6 which, in the present instance, has connected therewith a tubular housing 7 which extends downwardly about the hollow standard 2 and is provided with a portion, 8, which engages the outer surface of the standard and tends to hold the cap and the lifting element against tilting movement relatively to the standard and to thus maintain the screw in its proper longitudinal position and in alinement with its nut 3.

There is, however, more or less of a tilting strain imposed upon the screw under certain conditions of operation, and the nut is so mounted that it can accommodate itself to these slight movements of the screw so as to maintain the nut and screw in alinement and prevent any binding between the two parts. To accomplish this, the nut must have a slight lateral movement relatively to the supporting shoulder 9 of the standard, and it is desirable that this lower surface should be tapered or curved. However, where the lower end of the nut is tapered, there is a tendency to distort the tapered end of the nut, under tilting strains on the screw, and thus cause the threads thereon to bind upon the threads of the screw, thereby interfering with its free action. For this reason, it is desirable that the nut should have a flat lower end which will not be readily distorted. To permit of the nut being provided with a flat lower end and still being able to accommodate itself to lateral strains on the screw, we have provided the nut with an extension 10 which, in the present construction, is shown as formed separately from the nut itself and which constitutes an alining device or washer. This alining device has an internal diameter slightly larger than the largest diameter of the screw, and has its upper end flat to engage the flat end of the nut, and has its lower end tapered. Preferably, the lower surface of the alining device or washer conforms to a section of a sphere, and the shoulder 9 is correspondingly shaped so that the alining device will have free movement thereon. By means of this construction the nut may accommodate itself to any slight tilting movements of the screw, and the washer or alining device will shift its position to permit of this movement. But, inasmuch as the alining device is not in engagement with the screw, there is no binding action between the same and the screw or between the screw and the nut.

Inasmuch as the screw rotates relatively to the load engaging device or cap 6, it is desirable that an anti-friction bearing be interposed between the cap and the screw to facilitate the operation of the screw, and we have here shown such a bearing, which consists of a top plate 11, which, in the present instance, is formed separate from the cap and is seated in a recess in the bottom thereof, and a bottom plate 12 which is supported by the screw. Interposed between these plates is a series of anti-friction members, which are here shown as balls. As is customary, these balls are mounted in a carrier or cage 13, which maintains them in their proper relations one to the other but permits each ball to have free rotation about its individual axis. As bearings of this type are ordinarly constructed, the balls are arranged in series and each ball of each series travels in the same path and travels in this path all the time. Consequently, there is a tendency to form grooves or annular depressions in the bearing plates, which increase the frictional contact between the balls and the plates and thus tend to retard the free action of the bearing. To overcome this tendency, we have so constructed the carrier or cage 13 that the several balls will each travel in its individual path, and further, we have provided means which will permit each ball to change its line of travel from time to time, thus the entire surfaces of the bearing plates are utilized and there is no tendency to form grooves or irregularities in these surfaces. This may be accomplished by various arrangements of the balls but, preferably, each ball is spaced a different distance from the axis of the bearing and, in the present construction, I have shown the balls as arranged in a spiral, which results in placing each ball a different radial distance from the center of the bearing. Consequently, no two balls travel in the same path. To permit the individual balls to change their line of movement, we have provided the carrier 13 with a central opening 14, through which the stem 15 of the screw passes, which is slightly larger in diameter than the stem, thus permitting the carrier to have a slight lateral movement relatively to the bearing plates, which will cause the positions of the several balls relatively to the plates to be changed from time to time, thus preventing them from travelling constantly in single lines, which would tend to form grooves in the bearing plates.

The lifting element of the jack is provided with a rotatable member to which movement is imparted by suitable operating mechanism, and which serves to impart lifting movement to the lifting element. In the present instance, where the lifting element is in the form of a screw, we have shown this rotary member as a beveled gear 16 which is mounted on the stem 15 of the screw proper, this portion of the stem being angular in cross section to hold the gear against rotation relatively thereto. The connections between this rotary member and the actuating device may take various forms but, as here shown, the connection comprises a single beveled gear 17 which is secured to and, in the present instance, forms a part of a shaft 18 which is arranged at substantially right angles to the lifting element 5 and is journaled in a bearing 19 formed in a closure or plate 20, which closes an opening in the side of the housing 7. In the present construction, this shaft is of a considerable length and it is supported between its ends by a second bearing 21, which is formed in a partition 22 in a housing 23, which encloses the controlling mechanism, which is to be hereinafter described. The actuating devices are here shown as connected with the outer end of the shaft 18 and, in the present construction, these devices consist of a ratchet wheel 24 rigidly secured to the end of the shaft, and a pawl 25 cooperating with said ratchet wheel and yieldably mounted on a lever 26, by means of which the pawl may be caused to actuate the ratchet wheel and thus, through the connecting devices, transmit movement to the rotary member which is connected with the lifting element. As here shown, the lever comprises a socket member 27 adapted to receive a spike or hand bar, which will provide ample leverage for actuating the jack. The pawl 25 is shown in the form of a plunger which is slidably mounted in a tubular guideway 28 forming a part of the lever construction, and is held normally in yielding engagement with the ratchet wheel by means of a spring 29 coiled about the stem of the plunger and confined between the head of the plunger and the outer end of the guideway. The end of the plunger stem extends beyond the guideway and is provided with a head 30, by means of which the pawl may be retracted against the tension of the spring when it is desired to render the actuating devices inoperative. Various means may be provided for retaining the plunger or pawl in its retracted position but, in the present construction, the head 30 is flat on one side, as shown at 31, and this flat side lies close to a shoulder, 32, on the lever structure, so that when the head has been moved outward a distance sufficient to move the pawl into an inoperative position with relation to the ratchet wheel, the head may be rotated to cause the wider portion thereof to overlap the shoulder and thus prevent the pawl from being returned to its normal position. It is preferable that the pawl itself should not be rotated, and we have shown the head 30 as rotatably secured to the stem of the plunger, thus permitting it to be moved into locking position without rotating the plunger or pawl. The lever structure is, of course, rotatable about the axis of the shaft and it may be mounted in any suitable manner but, in the present construction, we have shown this structure as comprising a circular plate 33 which is mounted in a circular opening in the end of the housing 23, which opening forms a bearing in which the plate 33 may rotate, the plate also serving as a closure for the opening in the housing. It will be apparent, therefore, that so long as the pawl 25 is in its normal operative engagement with the ratchet wheel 24, the manipulation of the lever will cause the ratchet wheel and shaft 18 to be rotated; thus imparting operative movement to the lifting element.

We have provided mechanism cooperating with the rotary member for the lifting element in such a manner that the load may be lowered either by its own weight or by a positive operation of the lifting element in a downward direction, and this mechanism is preferably, but not necessarily, actuated by the lever structure which forms a part of the actuating device for imparting lifting movement to the lifting element. This mechanism may take various forms but, preferably, it embodies a controlling member which will be connected with the lifting element when the latter moves downwardly, or in a reverse direction, and a retarding member cooperating with said controlling member to hold the lifting element against downward movement except when said retarding member is actuated; and it may also include means for enabling the operation of the retarding member to positively drive the lifting element downwardly. In that form of the device here illustrated, we have mounted a worm wheel 33° loosely on the shaft 18 adjacent to the bearing 19, and have provided a clutch which will connect the worm wheel with the shaft when the latter is rotated in a direction to permit the downward movement of the lifting element. As here shown, we have provided the worm wheel with one member, 34, of the clutch, the clutch teeth being shown as formed integral with the hub of the worm wheel, and we have slidably mounted on the shaft 18 a second clutch member 35, having teeth which will cooperate with the clutch member 34. The clutch member 35 is held against rotation relatively to the shaft 18, preferably, by forming that portion of the shaft on which it is mounted of an angular cross section, and it is held in yielding engagement with the clutch member 34 by means of spring-pressed balls 36, which bear against the lateral portions of the clutch member. The clutch teeth are so arranged that when the shaft is rotated in a direction to elevate the lifting member, the teeth of the clutch member 35 will ride over the teeth of the clutch member 34 and there will be no tendency to rotate the worm wheel, but when the shaft is rotated in the opposite direction, the two sets of clutch teeth will engage one with the other and lock the shaft against movement relatively to the worm wheel. The worm wheel meshes with a worm 37 mounted on a shaft 38, which serves to hold it normally against movement. Consequently, the shaft 18 and the lifting element are normally locked positively against movement in a reverse direction, and the lifting element can only be lowered when the worm 37 is rotated. The clutch teeth are of such a character that there is scarcely a possibility of their failing to engage when the shaft is rotated in a reverse direction but, to eliminate all possibility of such a failure, under unusual circumstances, we have provided a supplemental clutch construction which will grip the shaft and connect it with the worm wheel, should there be a tendency of the shaft to move relatively to the worm wheel in a reverse direction. As shown in the accompanying drawings, (see Figs. 2 and 3) the hub of the worm wheel is provided with tapered recesses 39 arranged on opposite sides thereof and opening against the shaft 18. In each of these recesses is mounted a roller 40 which is pressed by a spring 41 toward the smaller end of the recess. So long as the shaft is rotated in a forward direction, the action of the shaft on the rollers will tend to move them toward the larger ends of the recesses and there will be no tendency on the part of the rollers to restrict the movement of the shaft, but as soon as the shaft rotates in a reverse direction, relatively to the worm wheel, it will tend to move the rollers toward the smaller ends of the recesses, thus causing them to grip the surface of the shaft and clutch the same to the worm wheel. This action will either entirely check the movement of the shaft relatively to the worm wheel, or will retard it to such an extent that the clutch members will have an opportunity to engage one with the other. A single clutch member, such as that last described, could be utilized for connecting the worm wheel to the shaft if the load were always to be lowered under its own weight but, as will be hereinafter explained, it is sometimes desirable to drive the load down positively and a friction clutch such as described would not have this function. Therefore, we prefer to utilize for the main connection a toothed clutch and to utilize a supplemental friction clutch as above explained. The worm 37 has connected therewith a train of gearing which may be connected with the actuating lever, or other suitable actuating devices, for rotating the worm and thus controlling the movement of the worm wheel. This gearing may take various forms but, for the sake of compactness, we prefer to use spiral gears and we have here shown a spiral gear 42 rigidly secured to and, in the present instance, formed integral with the worm wheel 37. Arranged directly above and meshing with the spiral gear 42, on an axis extending transversely to the axis of that gear, is a second spiral gear 43, which is mounted on a shaft 44 extending parallel with the driving shaft 18. The gear 43 is rigidly secured to and, in the present instance, formed integral with its shaft, and on this shaft is mounted a pinion 45 which meshes with a gear 46 rotatably mounted about the axis of the shaft 18. In the present construction the gear 46 is mounted on the outer surface of the bearing 21 in the partition 22 of the housing 23. Rigidly secured to the gear 46 is a ratchet wheel 47. Cooperating with this ratchet wheel (see Figs. 1 and 4) is a pawl 48 pivotally mounted on the lever 26 and having an arm 49 extending alongside of the plunger or main driving pawl 25. A pin 50 rigidly secured to the plunger 25 projects through a slot 51 in the inner wall of the guideway 28 in which the plunger is mounted, and extends above the arm 49. The spring 29, which holds the plunger in yielding engagement with the ratchet wheel 24, also holds the arm 49 in such a position as to retain the pawl 48 normally in an inoperative position with respect to the ratchet wheel 47, so that in the lifting operation there will be no contact between the ratchet wheel 47 and its pawl 48. A spring 52 tends to move the pawl 48 toward the ratchet wheel 47 and when the plunger is moved to its inoperative position, as above described, this spring will cause the pawl 48 to engage the ratchet wheel 47. When the plunger 25 has been moved into its inoperative position, the lever structure can be rotated after the manner of a crank wheel and it is provided with a handle 53, by means of which it may be so rotated. This rotation of the lever structure causes the pawl 48 to actuate the ratchet wheel 47 and gear 46, thus transmitting movement through the spiral gears to the worm 37, which rotates the worm wheel 33ª in such a direction as to permit the lifting element to move downwardly under the weight of the load, it having been above explained that the pitch of the lifting screw, in the present illustration of the invention, is such as to permit the screw to have this action. This mechanism may be actuated at such a speed as to rapidly lower the load, but the load can go no faster than the worm 37 is rotated, and it is always positively under the control of the operator.

Should the lifting element fail to move downward under the weight of the load, because the screw had become gummed, or for any other reason, the controlling mechanism may be utilized to positively move the same downward by simply causing the worm wheel 33 to be clutched to the shaft so that it will rotate the shaft instead of being rotated by the shaft. This we accomplish by locking the toothed clutch members in engagement one with the other. In the construction here shown, a slide block or plunger 54 is slidably mounted in the side wall of the housing 23 and arranged to enter the space between the clutch member 35 and the partition 22 when the clutch members are in engagement one with the other. This plunger is held normally in its retracted position by means of a spring 55 and is provided with a head or push rod 56 so arranged that it may be conveniently actuated by the operator. Thus if the lifting element does not move downward when the screw 37 is rotated, the worm 33 merely rotating on the shaft 18, it is only necessary for the operator to force the plunger inwardly to lock the clutch members in engagement and thus positively connect the worm wheel with the shaft, thus causing the shaft to be rotated by the worm and to impart reverse movement to the lifting element.

Preferably, an anti-friction thrust bearing 57 is interposed between the worm wheel 37 and the bearing for the shaft 38 to take up the thrust imparted to the worm wheel and the spiral gear 42. The worm, the worm wheel, and their cooperating parts are all mounted in a chamber 58 formed within the housing 23 between the closure 20 and the partition 22, and this chamber may contain oil, so that these parts will operate in an oil bath and will carry the oil upwardly and distribute it to those parts of the mechanism which are not immersed therein. The partition 22 may be provided with a port 59 which will convey oil from the chamber 58 to the bearings for the gear 46 and ratchet wheel 47.

The operation of the mechanism will be readily understood from the foregoing description of the several parts thereof, and it will be apparent that we have provided a mechanism of the character described which is very simple and compact in its construction, which is of a strong, rigid character, and in which the load may be rapidly lowered under the full control of the operator, and that there is no possibility of the lowering mechanism failing to operate, and thus causing the load to be lowered too rapidly for safety, this being prevented by the positive locking action of the worm against the worm wheel.

While we have shown and described one embodiment of our invention, we wish it to be understood that we do not desire to be limited to the details of construction thereof, as various modifications will occur to a person skilled in the art. For example, spiral gears or other devices having similar functions may be substituted for the worm and worm wheel and when so substituted will, obviously, be the full equivalent thereof. Further, the pitch of the worm and worm wheel may be such that the worm wheel will drive the worm and the spiral gear may be utilized as a locking or retarding medium.

Having thus fully described our invention, what we claim as new and desire to secure by Letters Patent is:

1. In a mechanism of the character described, a lifting element, a rotary member conencted with said lifting element, an actuating device to impart forward movement to said rotary member, a worm wheel, means for connecting said worm wheel with said rotary member when the latter is moved in a reverse direction, a worm meshing with said worm wheel, and means for disconnecting said actuating device from said rotary member and connecting the same with said worm.

2. In a mechanism of the character described, a lifting element, a rotary member connected with said lifting element, an actuating device to impart forward movement to said rotary member, a worm wheel, means for connecting said worm wheel with said rotary member when the latter is moved in a reverse direction, a worm meshing with said worm wheel, actuating means for said worm comprising a ratchet wheel, and a pawl cooperating therewith, said pawl being carried by the actuating device for said rotary member, and means for holding said pawl normally in an inoperative position and for rendering the same operative when said actuating device is disconnected from said rotary member.

3. In a mechanism of the character described, a lifting element, a rotary member connected with said lifting element, an actuating device to impart forward movement to said rotary member, a worm wheel, means for connecting said worm wheel with said rotary member when the latter is moved in a reverse direction, a worm meshing with said worm wheel, actuating means for said worm, said actuating means being normally inoperative, and means for disconnecting the first-mentioned actuating device from said rotary member and for rendering the last mentioned actuating device operative.

4. In a mechanism of the character described, a lifting element, a rotary member connected with said lifting element, an actuating device to impart forward movement to said rotary member, means for rendering said actuating device inoperative, a worm wheel, means for connecting said worm wheel with said rotary member when the latter is moved in a reverse direction, a worm meshing with said worm wheel, normally inoperative actuating means for said worm, and means to render said last-mentioned actuating means operative, said last-mentioned means being controlled by the means for disconnecting the first-mentioned actuating device from said rotary member.

5. In a mechanism of the character described, a lifting element, a rotary member connected with said lifting element, an actuating device to impart forward movement to said rotary member, means for rendering said actuating device inoperative, a worm wheel, means for connecting said worm wheel with said rotary member when the latter is moved in a reverse direction, a worm meshing with said worm wheel, an actuating device for said worm comprising a normally inoperative driving member, and means for rendering said driving member operative, said last-mentioned means being controlled by the means for disconnecting the first-mentioned actuating device from said rotary member.

6. In a mechanism of the character described, a lifting element, a rotary member connected with said lifting element, an actuating device to impart forward movement to said rotary member, means for rendering said actuating device inoperative, a worm wheel, means for connecting said worm wheel with said rotary member when the latter is moved in a reverse direction, a worm meshing with said worm wheel, an actuating device for said worm comprising a ratchet wheel, a pawl to cooperate with said ratchet wheel, said pawl being held normally in an inoperative position, and means for moving said pawl into operative engagement with its ratchet wheel, said last-mentioned means being controlled by the means for disconnecting the first-mentioned actuating device from said rotary member.

7. In a mechanism of the character described, a lifting element, a rotary member connected with said lifting element, an actuating device to impart forward movement to said rotary member, means for rendering said actuating device inoperative, a worm wheel, means for connecting said worm wheel with said rotary member when the latter is moved in a reverse direction, a worm meshing with said worm wheel, an actuating device for said worm comprising a ratchet wheel and a pawl, accelerating gearing interposed between said ratchet wheel and said worm, and means controlled by the means for disconnecting the first-mentioned actuating device from said rotary member for controlling the position of said pawl with relation to said ratchet wheel.

8. In a mechanism of the character described, a lifting element, a rotary member connected with said lifting element, an actuating device to impart forward movement to said rotary member, means for rendering said actuating device inoperative, a worm wheel, means for connecting said worm wheel with said rotary member when the latter is moved in a reverse direction, a worm meshing with said worm wheel, a spiral gear connected with said worm wheel, a second spiral gear meshing with the first-mentioned spiral gear, a pinion connected with said second spiral gear, a gear meshing with said pinion, a ratchet wheel rigidly connected with said last-mentioned gear, a pawl to actuate said ratchet wheel, and a connection between said pawl and the means for disconnecting said actuating device from said rotary member to control the position of said pawl with relation to said ratchet wheel.

9. In a mechanism of the character described, a lifting element, a rotary member connected with said lifting element, an actuating device to impart forward movement to said rotary member and comprising a ratchet wheel, a lever, and a part carried by said lever and cooperating with said ratchet wheel, a worm wheel, means for connecting said worm wheel with said rotary member when the latter is moved in a reverse direction, a worm meshing with said worm wheel, actuating means for said worm comprising a normally inoperative driving member, and a connection between said driving member and said part carried by said lever to render said driving member operative when said part is moved into an inoperative position with relation to its ratchet wheel.

10. In a mechanism of the character described, a lifting element, a rotary member connected with said lifting element, a ratchet wheel connected with said rotary member, a lever, a pawl carried by said lever and cooperating with said ratchet wheel, means for moving said pawl into an inoperative position, a worm wheel, means for connecting said worm wheel with said rotary member when the latter is moved in a reverse direction, a worm meshing with said worm wheel, an actuating device for said worm comprising a ratchet wheel, a pawl to cooperate with said ratchet wheel, means controlled by the pawl on said lever to hold the last-mentioned pawl normally in an inoperative position, and to cause the same to engage its ratchet wheel when the pawl on said lever is moved into an inoperative position.

11. In a mechanism of the character described, a lifting element, a rotary member connected with said lifting element, a ratchet wheel connected with said rotary member, a lever, a pawl carried by said lever and cooperating with said ratchet wheel, means for moving said pawl into an inoperative position, a worm wheel, means for connecting said worm wheel with said rotary member when the latter is moved in a reverse direction, a worm meshing with said worm wheel, an actuating device for said worm comprising a ratchet wheel, a normally inoperative pawl carried by said lever and arranged to cooperate with said last-mentioned ratchet wheel, and means controlled by the first-mentioned pawl to render the last-mentioned pawl operative when said first-mentioned pawl is moved into an inoperative position.

12. In a mechanism of the character described, a lifting element, a rotary member connected with said lifting element, a ratchet wheel connected with said rotary member, a lever, a pawl carried by said lever and cooperating with said ratchet wheel, means for moving said pawl into an inoperative position, a worm wheel, means for connecting said worm wheel with said rotary member when the latter is moved in a reverse direction, a worm meshing with said worm wheel, an actuating device for said worm comprising a ratchet wheel, accelerating gearing interposed between said ratchet wheel and said worm, a pawl connected with said lever and arranged to cooperate with the last-mentioned ratchet wheel, a connection between said pawls to cause the last-mentioned pawl to be held in an inoperative position when the first-mentioned pawl is operative and to cause said last-mentioned pawl to be moved into an operative position when the first-mentioned pawl is inoperative.

13. In a mechanism of the character described, a lifting element, a rotary member connected with said lifting element, a ratchet wheel connected with said rotary member, a lever, a pawl carried by said lever and cooperating with said ratchet wheel, means for moving said pawl into an inoperative position, a worm wheel, means for connecting said worm wheel with said rotary member when the latter is moved in a reverse direction, a worm meshing with said worm wheel, an actuating device for said worm comprising a ratchet wheel, accelerating gearing interposed between said ratchet wheel and said worm, a pawl connected with said lever and arranged to cooperate with the last-mentioned ratchet wheel, a connection between said pawls to cause the last-mentioned pawl to be held in an inoperative position when the first-mentioned pawl is operative, and to cause said last-mentioned pawl to be moved into an operative position when the first-mentioned pawl is inoperative, and means for retaining said first-mentioned pawl in an inoperative position.

14. In a mechanism of the character described, a lifting element, a rotary member connected with said lifting element, a shaft operatively connected with said rotary member, a ratchet wheel mounted on said shaft, an actuating member mounted for rotation about said shaft, a pawl carried by said actuating member to cooperate with said ratchet wheel, means for moving said pawl into an inoperative position and retaining the same in that position, a worm wheel mounted on said shaft, a clutch to connect said worm wheel with said shaft when the latter is moved in a reverse direction, a worm meshing with said worm wheel, an actuating device for said worm comprising a ratchet wheel mounted about said shaft and gearing interposed between said ratchet wheel and said worm, a pawl carried by said actuating member and adapted to cooperate with said last-mentioned ratchet wheel, means controlled by the first-mentioned pawl to hold the last-mentioned pawl normally in an inoperative position with relation to its ratchet wheel, and to cause the same to operatively engage said ratchet wheel when the first-mentioned pawl is moved into an inoperative position.

15. In a mechanism of the character described, a lifting element, a rotary member connected with said lifting element, a shaft connected with said rotary member, a ratchet wheel secured to said shaft, a lever rotatable about the axis of said shaft, a pawl carried by said lever to cooperate with said ratchet wheel, means for moving said pawl into an inoperative position and for retaining the same in that position, means for controlling the movement of said shaft in a reverse direction comprising a retarding member and a ratchet wheel connected therewith, a pawl to actuate said ratchet wheel, and means controlled by the pawl on said lever to hold said last-mentioned pawl normally in an inoperative position, and to cause the same to engage its ratchet wheel when the first-mentioned pawl is moved into an inoperative position.

16. In a mechanism of the character described, a lifting element, a rotary member connected with said lifting element, a shaft connected with said rotary member, a ratchet wheel secured to said shaft, a lever rotatable about the axis of said shaft, a pawl carried by said lever to cooperate with said ratchet wheel, means for moving said pawl into an inoperative position and for retaining the same in that position, means for controlling the movement of said shaft in a reverse direction, comprising a retarding member and a ratchet wheel connected therewith, a second pawl carried by said lever and adapted to cooperate with the last-mentioned ratchet wheel, a spring tending to move said pawl into engagement with said ratchet wheel, and a part carried by the first mentioned pawl to hold said last-mentioned pawl in an inoperative position when the first mentioned pawl is in an operative position.

17. In a mechanism of the character described, a lifting element, a rotary member connected with said lifting element, an actuating device to impart movement to said rotary member, a worm wheel, a clutch to connect said worm wheel with said rotary member when the latter is moved in a reverse direction, a worm meshing with said worm wheel, a normally inoperative actuating device for said worm, means controlled by the actuating device for said rotary member to render said last-mentioned actuating device operative, and means for causing said worm wheel to be connected with said rotary member when said worm wheel is rotated by said worm.

18. In a mechanism of the character described, a lifting element, a rotary member connected with said lifting element, an actuating device to impart movement to said rotary member, a worm wheel, a clutch comprising a yieldable member and adapted to connect said worm wheel with said rotary member when the latter is moved in a reverse direction, a worm meshing with said worm wheel, a normally inoperative actuating device for said worm, means for rendering the first-mentioned actuating device inoperative and the last mentioned actuating device operative, and means for locking the yieldable member of said clutch against movement to positively connect said worm wheel with said rotary member.

19. In a mechanism of the character described, a lifting element, a rotary member connected with said lifting element, a shaft connected with said rotary member, an actuating device mounted on said shaft, means for rendering said actuating device inoperative a worm wheel loosely mounted on said shaft, a clutch member connected with said worm wheel, a second clutch member slidably mounted on said shaft and held yieldingly in engagement with the first-mentioned clutch member, a worm meshing with said worm wheel, a normally inoperative actuating device for said worm and means controlled by said first-mentioned actuating device to render said last-mentioned actuating device operative, and a detent arranged to be moved into engagement with said yieldable clutch member to hold the same in engagement with said first-mentioned clutch member and positively secure said worm wheel to said shaft.

20. In a mechanism of the character described, a lifting element, a rotary member connected with said lifting element, a shaft connected with said rotary member, an actuating device mounted on said shaft, means for rendering said actuating device inoperative, a worm wheel loosely mounted on said shaft, a clutch member connected with said worm wheel, a second clutch member slidably mounted on said shaft and held yieldingly in engagement with the first-mentioned clutch member, a worm meshing with said worm wheel, a normally inoperative actuating device for said worm and means controlled by said first-mentioned actuating device to render said last-mentioned actuating device operative, a housing enclosing said worm wheel and said clutch members, a detent slidably mounted in the wall of said housing and operable from the exterior thereof to engage said yieldable clutch member to hold the same in engagement with the first-mentioned clutch member and positively connect said worm wheel with said shaft.

21. In a mechanism of the character described, a lifting element, an actuating device therefor comprising an operating member, a controlling member, means to connect said controlling member with said lifting element when the latter moves downwardly, a second member cooperating with said controlling member to retard the downward movement of said lifting element, and means to disconnect said operating member from said lifting element and connect the same with said retarding member, whereby the latter may be actuated by said operating member to permit said lifting element to move downwardly.

22. In a mechanism of the character described, a lifting element, an actuating device therefor comprising an operating member, a controlling member, means to connect said controlling member with said lifting element when the latter moves downwardly, a second member cooperating with said controlling member to retard the downward movement of said lifting element, means to positively connect said controlling member with said lifting element, and means to disconnect said operating member from said lifting element and to connect the same with said retarding member, whereby said controlling member may be caused to drive said lifting element downwardly.

23. In a mechanism of the character described, a lifting element, an actuating device therefor comprising an operating member, a controlling member, means to connect said controlling member with said lifting element when the latter moves downwardly, a second member cooperating with said controlling member to retard the downward movement of said lifting element, means to positively connect said controlling member with said lifting element, and means to actuate said retarding member to cause said controlling member to drive said lifting element downwardly.

24. In a mechanism of the character described, a lifting element, an actuating device therefor comprising an operating member, a rotatable member loosely connected with the lifting element, means for connecting said rotatable member with said lifting element when the latter moves downwardly, mechanism for operatively connecting said rotatable member with said operating member and for disconnecting the latter from said lifting element, said means comprising a device for retarding the movement of said rotatable member by the downward movement of said lifting element.

25. In a mechanism of the character described, a lifting element, an actuating device therefor comprising an operating member, a rotatable member loosely connected with the lifting element, means for connecting said rotatable member with said lifting element when the latter moves downwardly, mechanism for operatively connecting said rotatable member with said operating member and for disconnecting the latter from said lifting element, said means comprising a device for retarding the movement of said rotatable member by the downward movement of said lifting element, and means for rigidly connecting said rotatable member with said lifting element whereby said rotatable element may be caused to drive said lifting element downwardly.

26. In a mechanism of the character described, a lifting element, an actuating device therefor comprising an operating member, a worm wheel loosely connected with said lifting element, means to operatively connect said worm wheel with said lifting element when the latter moves downwardly, a worm meshing with said worm wheel, and means for disconnecting said operating member from said lifting element and connecting the same with said worm wheel, whereby the latter may be rotated by said operating member to rotate said worm wheel.

27. In a mechanism of the character described, a lifting element, an actuating device therefor comprising an operating member, a worm wheel loosely connected with said lifting element, means to operatively connect said worm wheel with said lifting element when the latter moves downwardly, a worm meshing with said worm wheel, means for disconnecting said operating member from said lifting element and connecting the same with said worm wheel, whereby the latter may be rotated by said operating member to rotate said worm wheel, and means to positively connect said worm wheel with said lifting element.

28. In a mechanism of the character described, a lifting element and an actuating device therefor comprising an operating member, a worm wheel loosely connected with said lifting element, means for operatively connecting said worm wheel with said lifting element when the latter moves downwardly, a worm meshing with said worm wheel, means for disconnecting said operating member from said lifting element and connecting the same with said worm, said means comprising intermeshing spiral gears.

29. In a mechanism of the character described, a lifting element and an actuating device therefor comprising an operating member, a worm wheel loosely connected with said lifting element, means for operatively connecting said worm wheel with said lifting element when the latter moves downwardly, a worm meshing with said worm wheel, and an actuating device for said worm arranged adjacent to the actuating device for said lifting element.

30. In a mechanism of the character described, a lifting element, a shaft connected with said lifting element, a rotatable member loosely mounted on said shaft, a clutch to connect said rotatable member with said shaft when said lifting member moves downwardly, an actuating device connected with said shaft to cause the latter to impart lifting movement to said lifting element, and a second actuating device mounted on said shaft and connected with said rotatable member to control the rotation thereof by said shaft when said lifting element moves downwardly.

31. In a mechanism of the character described, a lifting element, a shaft connected with said lifting element, a rotatable member loosely mounted on said shaft, a clutch to connect said rotatable member with said shaft when said lifting member moves downwardly, an actuating device connected with said shaft to cause the latter to impart lifting movement to said lifting element, a second actuating device mounted on said shaft and connected with said rotatable member to control the rotation thereof by said shaft when said lifting element moves downwardly, said connection comprising spiral gears interposed between said rotatable element and the actuating device therefor.

32. In a mechanism of the character described, a lifting element, a shaft connected with said lifting element, a rotatable member loosely mounted on said shaft, a clutch to connect said rotatable member with said shaft when said lifting member moves downwardly, an actuating device connected with said shaft to cause the latter to impart lifting movement to said lifting element, a second actuating device mounted on said shaft and connected with said rotatable member to control the rotation thereof by said shaft when said lifting element moves downwardly, and an operating member adapted to be connected with either of said actuating devices.

33. In a mechanism of the character described, a lifting element, a shaft connected with said lifting element, a worm wheel loosely mounted on said shaft, a clutch to connect said worm wheel with said shaft when said lifting element moves downwardly, an actuating device operatively connected with said shaft to impart lifting movement to said lifting element, said actuating device comprising an operating member adapted to be disconnected therefrom, a worm meshing with said worm wheel, and an actuating device for said worm comprising a part arranged adjacent to the first-mentioned actuating device and adapted to be connected with said operating member when the latter is disconnected from said shaft.

34. In a mechanism of the character described, a lifting element, a shaft connected with said lifting element, a worm wheel loosely mounted on said shaft, a clutch to connect said worm wheel with said shaft when said lifting element moves downwardly, an actuating device operatively connected with said shaft to impart lifting movement to said lifting element, said actuating device comprising an operating member adapted to be disconnected therefrom, a worm meshing with said worm wheel, and an actuating device for said worm comprising a part rotatably mounted about the axis of said shaft, and means for connecting said part with said operating member.

35. In a mechanism of the character described, the combination with a lifting element, a shaft connected with said lifting element, a ratchet wheel secured to said shaft, an operating member rotatable about the axis of said shaft, a pawl carried by said operating member to engage said ratchet wheel, a worm wheel loosely mounted on said shaft, a clutch to connect said worm wheel with said shaft when said lifting element moves downwardly, a worm meshing with said worm wheel, a second ratchet wheel mounted for rotation about the axis of said shaft and operatively connected with said worm, a second pawl carried by said operating member to engage said last mentioned ratchet wheel, and means for rendering either of said pawls inoperative.

36. In a mechanism of the character described, the combination with a lifting element, a shaft connected with said lifting element, a ratchet wheel secured to said shaft, an operating member rotatable about the axis of said shaft, a pawl carried by said operating member to engage said ratchet wheel, a worm wheel loosely mounted on said shaft, a clutch to connect said worm wheel with said shaft when said lifting element moves downwardly, a worm meshing with said worm wheel, a second ratchet wheel mounted for rotation about the axis of said shaft, means for connecting said ratchet wheel with said worm comprising spiral gears, a second ratchet wheel carried by said operating member and adapted to engage the last mentioned ratchet wheel, and means for rendering either of said pawls inoperative.

37. In a mechanism of the character described, a lifting element, an actuating device therefor, a controlling member, means to connect said controlling member with said lifting element when the latter moves downwardly, a second member connected with said controlling member to control the movement thereof, means for actuating said second member, and a housing enclosing said members and adapted to contain a lubricant.

38. In a mechanism of the character described, a lifting element, a shaft connected with said lifting element, means for rotating said shaft, a worm wheel loosely mounted on said shaft, a clutch to connect said worm wheel with said shaft when said lifting element moves downwardly, a worm meshing with said worm wheel, means for actuating said worm, and a housing enclosing said worm and said worm wheel and adapted to contain a lubricant in which one of said parts will be wholly or partly immersed.

39. In a mechanism of the character described, a lifting element, a structure surrounding said lifting element and having an opening in one side thereof, a housing comprising an end plate closing said opening and secured to said structure, said housing also comprising a wall spaced from said plate, said wall and said plate having bearings, a shaft journaled in said bearings and connected with said lifting element, a worm wheel loosely mounted on said shaft within said housing, a clutch to connect said worm wheel to said shaft when said lifting element moves downwardly, a worm also mounted in said housing for meshing with said worm wheel, and means for actuating said worm, said housing being adapted to contain a lubricant.

40. In a mechanism of the character described, a lifting element, a structure surrounding said lifting element and having an opening in one side thereof, a housing comprising an end plate closing said opening and secured to said structure, said housing also comprising a wall spaced from said plate, said wall and said plate having bearings, a shaft journaled in said bearings and connected with said lifting element, a worm wheel loosely mounted on said shaft within said housing, a clutch to connect said worm wheel to said shaft when said lifting element moves downwardly, a worm also mounted in said housing for meshing with said worm wheel, and an actuating device for said worm comprising a pair of spiral gears mounted in said housing, said housing being adapted to contain a lubricant.

41. In a mechanism of the character described, a lifting element, a structure surrounding said lifting element and having an opening in one side thereof, a housing comprising an end plate mounted in said opening and secured to said structure, said housing also comprising a wall spaced from said plate, said wall and said plate having bearings, a shaft journaled in said bearings and connected with said lifting element, a worm wheel loosely mounted on said shaft within said housing, a clutch to connect said worm wheel to said shaft when said lifting element moves downwardly, a worm also mounted in said housing for meshing with said worm wheel, means for actuating said worm, said housing being adapted to contain a lubricant, and a detent slidably mounted in the wall of said housing to engage said clutch and positively secure said worm to said shaft.

42. In a mechanism of the character described, the combination with a lifting element, an actuating device therefor, a rotatable member, a clutch to connect said rotatable member with said lifting element when the latter moves downwardly, said clutch comprising a yieldable part, means for actuating said rotatable member to control the downward movement of said lifting element, and means to lock the yieldable part of said clutch against movement to cause said rotatable member to be positively connected to said lifting element.

43. In a mechanism of the character described, a lifting element, a shaft connected with said lifting element, means for rotating said shaft to actuate said lifting element, a rotatable member loosely mounted on said shaft, a clutch member connected with said rotatable member, and a second clutch member slidably mounted on said shaft and arranged to connect said rotatable element with said shaft when said lifting element moves downwardly, a second rotatable member operatively connected with the first mentioned rotatable member, means for actuating said second rotatable member, and a locking device to engage the slidable member of said clutch and hold the same positively in engagement with that member of said clutch which is connected with said rotatable member.

44. In a mechanism of the character described, a lifting element, a shaft connected with said lifting element, means for rotating said shaft to actuate said lifting element, a rotatable member loosely mounted on said shaft, a clutch comprising a yieldable clutch member to connect said rotatable member with said shaft when said lifting member moves downwardly, a second member cooperating with said rotatable member to control the downward movement of said shaft, means for actuating said second member, and a friction clutch interposed between said rotatable member and said shaft to prevent said shaft from being rotated relatively to said rotatable member by the downward movement of said lifting element.

45. In a mechanism of the character described, a lifting element, a shaft connected with said lifting element, means for rotating said shaft to actuate said lifting element, a rotatable member loosely mounted on said shaft, a clutch comprising a yieldable clutch member to connect said rotatable member with said shaft when said lifting member moves downwardly, a second member cooperating with said rotatable member to control the downward movement of said shaft, means for actuating said second member, said rotatable member having tapered slots therein opening against the surface of said shaft, and rollers mounted in the respective slots, said slots being so arranged that the movement of said shaft relatively to said rotatable member in a reverse direction will cause said rollers to lock said rotatable member to said shaft.

46. In a mechanism of the character described, a lifting element, an actuating device therefor comprising an operating member, a worm wheel loosely connected with said lifting element, means for operatively connecting said worm wheel with said lifting element when the latter moves downwardly, a worm meshing with said worm wheel, a device for controlling the rotation of said worm during the downward movement of said lifting element, and retarding means operatively interposed between said controlling device and said worm, whereby the connection between the worm and the controlling device is through the retarding means.

47. In a mechanism of the character described, a lifting element, a worm wheel, means for connecting said worm wheel with said lifting element for rotation thereby when said lifting element moves downwardly, a worm meshing with said worm wheel, a device to control the movement of said worm during the downward movement of said lifting element, and spiral gearing interposed between said worm and said controlling device.

48. In a mechanism of the character described, a lifting element, a worm wheel disconnected from said lifting element during the upward movement of said lifting element, means for connecting said worm wheel with said lifting element for rotation thereby when said lifting element moves downwardly, a worm meshing with said worm wheel, an actuating device for said worm, and spiral gearing interposed between said worm and said actuating device.

49. In a mechanism of the character described, a lifting element, a worm wheel, means for connecting said worm wheel with said lifting element for rotation thereby when said lifting element moves downwardly, a worm meshing with said worm wheel, a device to control the movement of said worm during the downward movement of said lifting element, and a retarding device operatively interposed between said worm and said controlling device, whereby the connection between the worm and the controlling device is through the retarding means.

50. In a mechanism of the character described, a lifting element, a rotary member connected with said lifting element, an actuating device to impart forward movement to said rotary member, a worm wheel, means for connecting said worm wheel with said rotary member when the latter is moved in a reverse direction, a worm meshing with said worm wheel, a spiral gear connected with said worm, a second spiral gear meshing with the first mentioned spiral gear, and means connected with said second spiral gear to control the movement of said worm.

51. In a mechanism of the character described, a lifting element, an actuating device therefor comprising an operating member, a controlling member normally disconnected from said lifting member, a second member cooperating with said controlling member to retard the downward movement of said lifting element, means to connect said controlling member with said lifting element, and means to actuate said retarding member to cause said controlling member to drive said lifting element downwardly.

52. In a mechanism of the character described, a lifting element, an actuating device therefor, a controlling member, means to connect said controlling member with said lifting element when the latter moves downwardly, a second member connected with said controlling member to control the movement thereof by said lifting member, spiral gearing connected with said second member, a housing enclosing said members and said gearing and adapted to contain a lubricant, and means arranged externally of said housing and connected with said spiral gearing for controlling the movement of said second member.

53. In a mechanism of the character described, a lifting element, a shaft connected with said element, means for rotating said shaft, a worm wheel movably mounted on said shaft, means for connecting said worm wheel with said shaft when said lifting element moves downwardly, a worm meshing with said worm wheel, spiral gearing connected with said worm, a housing enclosing said worm wheel, said worm and said gearing and adapted to contain a lubricant in which one of said parts will be wholly or partly immersed, and means arranged exteriorly of said housing and connected with said spiral gearing for controlling the rotation of said worm.

In testimony whereof, we affix our signatures hereto.

CHARLES W. RIPSCH.
JAMES C. DAWLEY.
CHARLES D. DERBY.